May 8, 1973   D. R. LANKARD ET AL   3,732,115
SILICIOUS COMPOSITION FOR MARKING HOT METAL AND
METHOD OF MAKING AND USING SAME
Filed Aug. 30, 1971
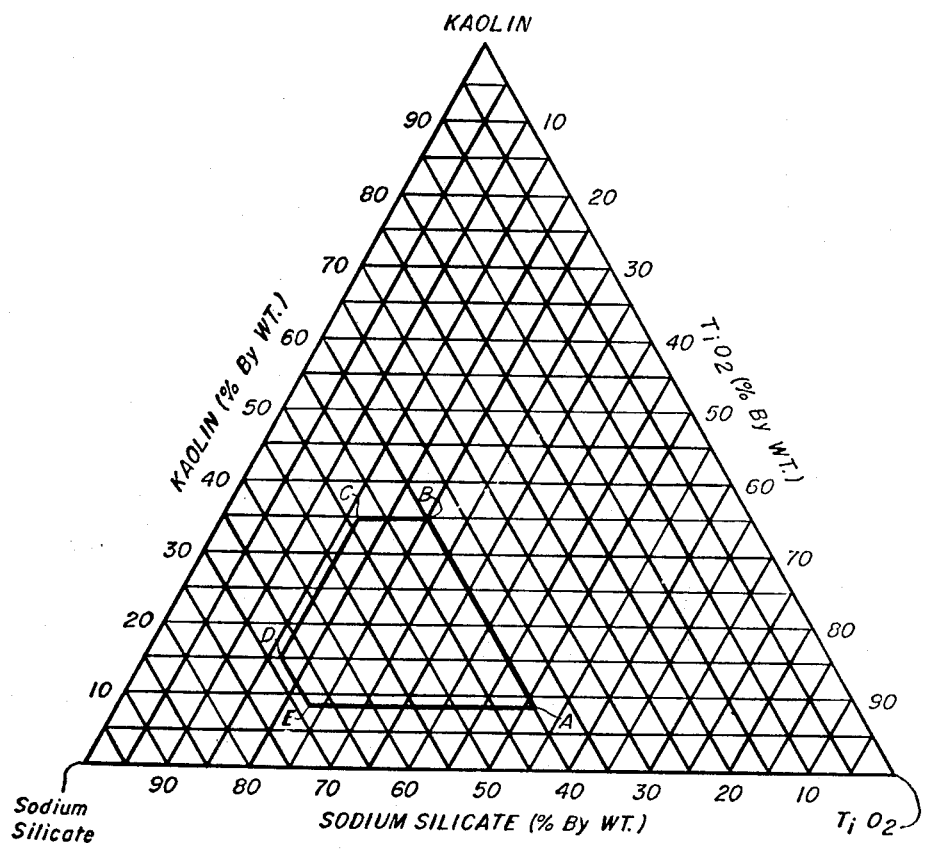

United States Patent Office 3,732,115
Patented May 8, 1973

3,732,115
SILICIOUS COMPOSITION FOR MARKING HOT METAL AND METHOD OF MAKING AND USING SAME
David R. Lankard, Granview Heights, and Herbert D. Sheets, Jr., Columbus, Ohio, assignors to United States Steel Corporation, Pittsburgh, Pa.
Continuation-in-part of application Ser. No. 840,225, July 9, 1969, which is a continuation-in-part of abandoned application Ser. No. 612,783, Jan. 31, 1967. This application Aug. 30, 1971, Ser. No. 176,051
Int. Cl. C09d 1/02, 11/00, 13/00
U.S. Cl. 106—19          2 Claims

ABSTRACT OF THE DISCLOSURE

A liquid composition for marking metal products while at high temperature, by jet-spray application, comprises a pigment of metal oxide, such as titanium dioxide, in a vehicle of sodium-silicate solution containing kaolin as a suspending agent. A method of making such composition is also disclosed.

---

This application is a continuation-in-part of U.S. patent application Ser. No. 840,225, filed July 9, 1969, which application is a continuation-in-part of U.S. patent application Ser. No. 612,783, filed Jan. 31, 1967, by applicants, and both now abandoned.

This invention relates to marking composition suited for jet-spray application to hot metal products in the course of manufacture, in order to make possible subsequent identification thereof.

The most pertinent prior art known to us is Goss Pat. 1,698,302, Hannen et al. Pat. No. 1,744,116, and Happe Pat. No. 2,711,974.

The problem of marking metal products, such as steel plates or the like, while hot from rolling, has remained unsolved heretofore for lack of a marking material with the ability to stand up under the temperature of the product and which could be mechanically applied. Hand marking of hot plates is not desirable for safety reasons. It is not feasible, furthermore, to wait until the product has cooled to apply the marking. Mechanical marking means, settable from a distance, have been developed for this purpose and it is the object of our invention to provide a liquid which may be applied by such apparatus as a jet spray and which will afford a strongly adherent, readily legible and long-lasting mark by which the product may be quickly identified in subsequent processing or use.

For a better understanding of this invention, reference should be made to the accompanying drawing, wherein the sole figure is a ternary diagram showing the compositional range of solid constituents of the hot marking ink of the subject invention.

Our marking composition, in general terms, is an aqueous suspension of a metal oxide, e.g. titanium dioxide, in a sodium-silicate solution containing kaolin as a suspending agent. The titanium dioxide serves as a pigment and the kaolin-containing solution as the vehicle.

More specifically, the formula of our composition is as shown in the drawing and as follows:

|   | Parts by weight |
|---|---|
| Titanium dioxide | 16–52 |
| Kaolin | 8–35 |
| Sodium silicate (solids) | 40–69 |
| Total solids to total | 100 | in coordinated amounts falling within the ranges defined by the area bounded by the line ABCDE in the accompanying drawing, with the total solids suspended in an amount of water between 59 to 263 parts providing said composition with a viscosity of 70 to 80 Krebs units at 20° C.

To be useful for purposes of the invention, a marking composition of unique characteristics is required and rigid performance requirements are imposed therein. The marking composition must be liquid or liquid-like so as to be free-flowable and jet sprayable; its viscosity must permit jet spraying, yet at high temperatures (when contacting the hot metal product) it must not significantly bubble, should coalesce readily, and not spread or run to such an extent as to destroy legibility of its applied configuration (e.g., numerals or letters); and in addition the applied composition should dry and/or harden quickly to provide a strongly adherent weather-resistant marking. Only certain materials, and then in only limited and coordinated amounts, are useful to provide a marking composition of those requisite characteristics and balanced properties so as to be of utility for jet-spray application of legible markings to very hot metal products.

From the ternary diagram of the accompanying drawing, it can be noted that the line AB defines the lower limit of 40 percent and the line DE defines the upper limit of 69 percent for the sodium silicate solids content of the total solids content of the composition. The sodium silicate solids function to provide satisfactory adherence of the marking composition to the metal product. With less than 40 percent of the total solids being sodium silicate solids, there results an unsatisfactory and poor adherence of the marking composition to the metal product. When more than 69 percent of the total solids content is sodium silicate solids, the marking composition is insufficiently refractory in nature in that upon application, it flows and melts so as to be detrimental to legibility. From the ternary diagram, it can be noted that the line CD defines the lower limit of 16 percent for the titanium dioxide content of the total solids of the composition, and also that the point A defines the upper limit to be 52 percent for the titanium dioxide content of the total solids in the composition. With a marking composition's total solids containing less than 16 percent $TiO_2$, or other metal oxide pigment, the composition contains insufficient coloring pigment to provide a readily discernible and legible marking, and when containing $TiO_2$ as more than 52 percent of the total solids, the composition's adherence is unsatisfactory. From the ternary diagram, it also can be noted that the line EA defines the lower limit of 8 percent for the kaolin content of the total solids and the line CB defines the upper limit of 35 percent for the kaolin content of the total solids in the marking composition. An amount of kaolin at least 8 percent of the total solids is necessary to serve as a suspending agent for the metal oxide, e.g., $TiO_2$. This amount of kaolin also serves to stabilize the viscosity of the marking composition, while held in a feed tank for subsequent jet spray application, over a normally encountered 20 to 30° C., and somewhat higher temperature variance of the environment surrounding the feed tank in ordinary usage. When kaolin exceeds about 35 percent of the solids content, the amount of water requisite to provide the composition with a viscosity for jet spray application is so large that such a composition upon hitting the hot metal splatters with a resulting loss of marking legibility. It should be readily apparent from the foregoing that there exists a unique interdependence and coordination of the metal oxide, kaolin, sodium silicate solids, and their amounts, as defined by the area bounded by the line ABCDE in the accompanying drawing, in order to provide a marking composition useful for the purposes taught herein.

In making a typical example, considered the preferred example of our composition, we mix about 4.8 lb. of finely ground titanium dioxide and about 1.2 lb. kaolin in one gal. of a sodium silicate solution of about 50° Baumé (12.8 lb./gal.), containing about 44% solids by weight. Up to 0.25 gal. of water and the sodium silicate solution preferably are first blended together. The kaolin is then added and mixed so that all particles are wetted. Finally, the titanium dioxide is added and the mixing is continued in a high-speed, high-shear propeller type mixer or Cowles Dissolver (Cowles Dissolver Co., Inc., Cayuga, N.Y., Model 1–VG) for from 15 to 25 minutes. The viscosity of the resulting overall composition then is reduced by adding a small amount of additional water, to assure a freely-flowing characteristic in the requisite range for optimum spraying characteristics (about 70–80 Krebs units and preferably 75 Krebs units).

The solids content of the composition also is interdependent on the water content of the marking composition as the water content thereof chiefly controls the composition's viscosity. The lower limit of 70 Krebs units for the viscosity of the marking composition is critical and is dictated in that compositions of lower viscosity bounce, splatter, and do not provde an initial adherence of the applied composition to the hot metal. The upper viscosity limit of about 80 Krebs units arises from a useful and practical basis in that present-day jet-spray equipment generally is not conducive to spraying more viscous compositions. It should be noted, though, that the composition must of necessity always contain some water content as some water is needed in the composition to promote and provide an initial adherence of the applied composition to the hot metal.

A preferred formulation of our composition is:

| Ink constituents— | Composition, Parts by weight |
|---|---|
| Titanium dioxide (TiO$_2$) | 41.2 |
| Kaolin | 10.3 |
| Sodium silicate aqueous solution (44.1% solids) | $^1$ 48.5 $^2$ 61.5 |
| Distilled water | 18.9 |
|  | 180.4 |

$^1$ Solids.
$^2$ H$_2$O.

The titanium dioxide should be in a fine state of subdivision, i.e., commercially available pigment grade and suitably Type R 510 and its equivalent manufactured by E. I. du Pont de Nemours and Co., Wilmington, Del. Metal oxides other than titania may be substituted therefor, i.e., wollastonite (CaSiO$_3$), silica (SiO$_2$), alumina (Al$_2$O$_3$), beryllia (BeO), or zirconia (ZO$_2$), with it contemplated that the useful amounts of each also will interdepend on the employed sodium silicate solids and kaolin and their amounts in a close approximation to the relationship taught herein for titanium dioxide, but not necessarily in the identical relationship, and with a useful marking being obtainable, but not necessarily the equivalent marking.

We find it desirable to use kaolin in a very fine form, i.e., an air-floated, chemically purified kaolin, because this grade of material is non-reactive with sodium-silicate and gives the composition a viscosity which remains quite stable over considerable periods of time regardless of temperature changes. "Ajax P" kaolin, manufactured by Georgia Kaolin Company, Elizabeth, N.J., is a suitable product. In addition, this form of kaolin is highly effective as a suspending agent and thus prevents rapid settling of the pigment, titanium dioxide. The whiteness of the kaolin, furthermore, avoids any impairment of the reflectivity of the composition as applied, which is characteristic of the titanium dioxide. Any refractory clay in a suitable state of subdivition which is non-reactive with sodium silicate may be substtuted for Ajax P kaolin.

Property data on the Ajax P kaolin is as follows:

PARTICLE SIZE ANALYSIS

| Equivalent spherical diameter, microns— | Percent finer by weight |
|---|---|
| 5 | 100 |
| 2 | 96 |
| 1 | 84 |
| 0.5 | 60 |
| 0.3 | 39 |

TYPICAL CHEMICAL ANALYSIS

| Constituents— | Parts by weight |
|---|---|
| SiO$_2$ | 45.20 |
| Al$_2$O$_3$ | 38.08 |
| Fe$_2$O$_3$ | 0.49 |
| TiO$_2$ | 1.52 |
| CaO | 0.26 |
| MgO | 0.30 |
| Na$_2$O | 0.02 |
| K$_2$O | 0.04 |
| Loss on ignition | 13.51 |
| Pyrometric cone equivalent | 36 |

The sodium silicate used preferably has a 2:1 ratio of SiO$_2$ to Na$_2$O by weight and suitably is manufactured by Philadelphia Quartz Company, Philadelphia, Pa.

Our composition, made as described above, is a smooth mixture, of paint consistency, which may be discharged under pressure through very small orifices without danger of plugging them. When an instantaneous jet spray thereof impinges on metal products at from 800° to 1600° F., moreover, the individual droplets coalesce readily but do not spread or run to such an extent as to blur the outline of characters formed by stencils through which the spray is projected. By reason of the temperature of the product, furthermore, our liquid composition is quickly dried and hardened into a strongly adherent, weatherproof inscription.

We claim:
1. A method of making a composition for marking a hot metal product while said hot metal product is at a temperature of about 800° to about 1600° F., said method including the steps of:
   (a) blending a mixture of about 0.25 gallon of water and about 40 to about 69 parts by weight of sodium silicate solution of about 50° Baumé and having about a 2:1 ratio of SiO$_2$ to Na$_2$O by weight;
   (b) adding to and mixing with said mixture about 8 to about 35 parts by weight of kaolin as a suspending agent and as a stabilizer of viscosity;
   (c) adding to and mixing with said kaolin containing mixture about 16 to about 52 parts by weight of a metal oxide for use as a pigment to form a suspension;
   (d) said water, said sodium silicate solution, said kaolin and said metal oxide being added and mixed in coordinated amounts falling within the ranges defined by the area bounded by the line ABCDE in the accompanying drawing; and
   (e) adding sufficient water to said suspension so that the amount of water in said suspension is between about 59 to about 263 parts by weight to provide a marking composition having a viscosity of about 70 to about 80 Krebs units, thereby eliminating splatter of said composition on said hot metal product and providing a sprayable composition which adheres to said hot metal product.

2. A method of marking a hot metal product while said hot metal product is at a temperature of about 800° to about 1600° F., said method including the steps of:
   (a) blending a mixture of water and solids of from about 16 to about 52 parts by weight of a metal oxide for use as a pigment, about 40 to about 69 parts by weight of a sodium silicate solution of about 50° Baumé and having about a 2:1 ratio of SiO$_2$ to Na$_2$O by weight to cause adherence of said metal oxide to said hot metal product, and about 8 to about 35 parts by weight of kaolin as a suspending agent and as a stabilizer of viscosity, in coordinated amounts falling within the ranges defined by the area bounded by the line ABCDE in the accompanying drawing to form a suspension;

(b) adding sufficient water to said suspension so that the amount of water in said suspension is about 59 to about 263 parts by weight to provide a marking composition having a viscosity of about 70 to about 80 Krebs units, thereby eliminating splatter of said composition on said hot metal product and providing a sprayable composition which adheres to said hot metal product; and (c) jet spraying said marking composition onto the hot metal product while said hot metal product is at a temperature of about 800° to 1600° F.

References Cited

UNITED STATES PATENTS

| | | | |
|---|---|---|---|
| 1,698,302 | 1/1929 | Goss | 106—19 X |
| 1,744,116 | 1/1930 | Hannen et al. | 106—84 |
| 2,711,974 | 6/1955 | Happe | 106—84 X |
| 3,208,874 | 9/1965 | Conner | 117—135.1 |
| 3,356,515 | 12/1967 | McGlothin | 106—84 |
| 3,132,955 | 5/1964 | Nameishi | 106—84 X |

JOAN B. EVANS, Primary Examiner

U.S. Cl. X.R.

106—71, 73, 84, 286; 117—104, 135.1, 169; 148—6.14, 627